(12) United States Patent
Singh et al.

(10) Patent No.: US 10,960,726 B2
(45) Date of Patent: Mar. 30, 2021

(54) WORK VEHICLE WITH FLAP FOR CAB PRESSURE CONTROL

(71) Applicant: CNH Industrial America LLC, New Holland, PA (US)

(72) Inventors: Samrendra K. Singh, Bolingbrook, IL (US); Hesam Abbassi, Chicago, IL (US); Panos Tamamidis, Mount Prospect, IL (US); Leonid Chernyavsky, Glenview, IL (US)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 16/418,159

(22) Filed: May 21, 2019

(65) Prior Publication Data

US 2020/0369111 A1 Nov. 26, 2020

(51) Int. Cl.
*B60H 1/00* (2006.01)
*B62D 33/06* (2006.01)
*B60H 1/26* (2006.01)

(52) U.S. Cl.
CPC ..... *B60H 1/00378* (2013.01); *B60H 1/00892* (2013.01); *B60H 1/26* (2013.01); *B60H 2001/006* (2013.01); *B62D 33/06* (2013.01)

(58) Field of Classification Search
CPC .............. B60H 1/00892; B60H 1/26; B60H 2001/006; B60H 1/00378; B62D 33/06
See application file for complete search history.

(56) References Cited

U.S. PATENT DOCUMENTS

2010/0112924 A1* 5/2010 Alexander ............ F16K 31/025
454/70
2018/0178627 A1* 6/2018 Ferri ................... B60H 1/00378

* cited by examiner

*Primary Examiner* — D Glenn Dayoan
*Assistant Examiner* — Melissa Ann Bonifazi
(74) *Attorney, Agent, or Firm* — Rickard K. DeMille; Rebecca L. Henkel

(57) ABSTRACT

A cab for a work vehicle includes: walls enclosing a cab environment; a door coupled to one of the walls, one of the walls or the door comprising a vent opening; a heating, ventilation, and air conditioning (HVAC) system coupled to the cab environment and configured to regulate a temperature and a pressure of the cab environment; and a pressure control flap associated with the vent opening and comprising a pressure-relief opening and a magnetic portion that is configured to hold the flap closed when the pressure of the cab environment is below a threshold pressure and allow the pressure to open the flap when the pressure exceeds the threshold pressure.

18 Claims, 4 Drawing Sheets

WORK VEHICLE WITH FLAP FOR CAB PRESSURE CONTROL

FIELD OF THE INVENTION

The present invention pertains to work vehicles and, more specifically, to work vehicles with environment-controlled cabs.

BACKGROUND OF THE INVENTION

Certain work vehicles (e.g., tractors, harvesters, skid steers, etc.) include a heating, ventilation, and air conditioning (HVAC) system configured to control an airflow into a cab of the work vehicle. In addition to heating and cooling the cab of the work vehicle, the HVAC system also may pressurize the cab to a pressure higher than atmospheric pressure. Pressurizing the cab may reduce the ingress of dirt and/or other contaminants, such as crop material dust, enhance passenger comfort, reduce noise, or a combination thereof. In certain scenarios, known HVAC systems do not maintain some parameters of the cab environment to levels that are comfortable for the operator.

What is needed in the art is a cab for a work vehicle that can maintain a comfortable cab environment in various scenarios.

SUMMARY OF THE INVENTION

Exemplary embodiments disclosed herein provide a pressure control flap with a pressure-relief opening and a magnetic portion that holds the flap closed when a pressure of a cab environment is below a threshold pressure and allows the pressure to open the flap when the pressure exceeds the threshold pressure.

In some exemplary embodiments provided in accordance with the present disclosure, a cab for a work vehicle includes: a plurality of walls enclosing a cab environment; a door coupled to one of the walls, one of the walls or the door including a vent opening; a heating, ventilation, and air conditioning (HVAC) system coupled to the cab environment and configured to regulate a temperature and a pressure of the cab environment; and a pressure control flap associated with the vent opening and comprising a pressure-relief opening and a magnetic portion that is configured to hold the flap closed when the pressure of the cab environment is below a threshold pressure and allow the pressure to open the flap when the pressure exceeds the threshold pressure.

In some exemplary embodiments provided in accordance with the present disclosure, a work vehicle includes a chassis and a cab carried by the chassis. The cab includes: a plurality of walls enclosing a cab environment; a door coupled to one of the walls, one of the walls or the door including a vent opening; a heating, ventilation, and air conditioning (HVAC) system coupled to the cab environment and configured to regulate a temperature and a pressure of the cab environment; and a pressure control flap associated with the vent opening and comprising a pressure-relief opening and a magnetic portion that is configured to hold the flap closed when the pressure of the cab environment is below a threshold pressure and allow the pressure to open the flap when the pressure exceeds the threshold pressure.

One possible advantage that may be realized by exemplary embodiments disclosed herein is that the pressure control flap can dampen pressure spikes that occur when, for example, the door is slammed shut.

Another possible advantage that may be realized by exemplary embodiments disclosed herein is that the pressure control flap can help maintain the pressure inside the cab environment at a comfortable level at both high and low airflow settings.

BRIEF DESCRIPTION OF THE DRAWINGS

For the purpose of illustration, there are shown in the drawings certain embodiments of the present disclosure. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
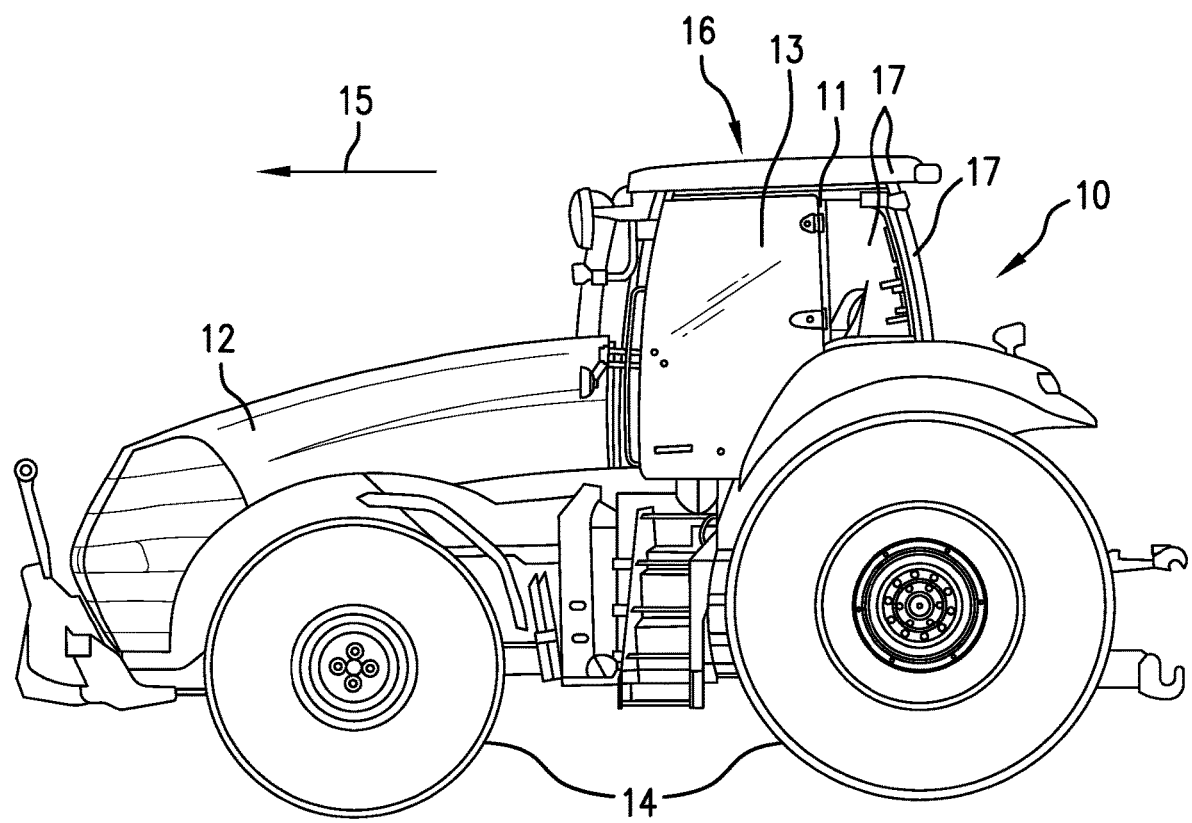
FIG. 1 illustrates a perspective view of an exemplary embodiment of a work vehicle, the work vehicle comprising a chassis and a cab carried by the chassis, in accordance with an exemplary embodiment of the present disclosure.

Referring now to the drawings, and more particularly to FIG. 1, a side view of an exemplary embodiment of a work vehicle 10 is illustrated that includes a chassis 12 and wheels 14 carried by the chassis 12. The wheels 14 may be driven by, for example, an engine and transmission to propel the work vehicle 10 along terrain in a direction of travel 15, as is known. It should be appreciated that while the illustrated work vehicle 10 is in the form of an agricultural tractor, the work vehicle may take other forms, such as a harvester, skid steer, dozer, etc. according to the present disclosure.

A cab 16 is carried by the chassis 12 and provides an area for an operator to sit and control the work vehicle 10. The cab includes a plurality of walls 17 that are connected to one another to enclose a cab environment. A door 13 is coupled with one of the walls 17 to open and close a door opening 11. An operator may open and close the door 13 to access the cab environment, as is known. The door opening 11 and/or the door 13 may have sealing elements associated therewith to help maintain the cab environment.

Figure 2:
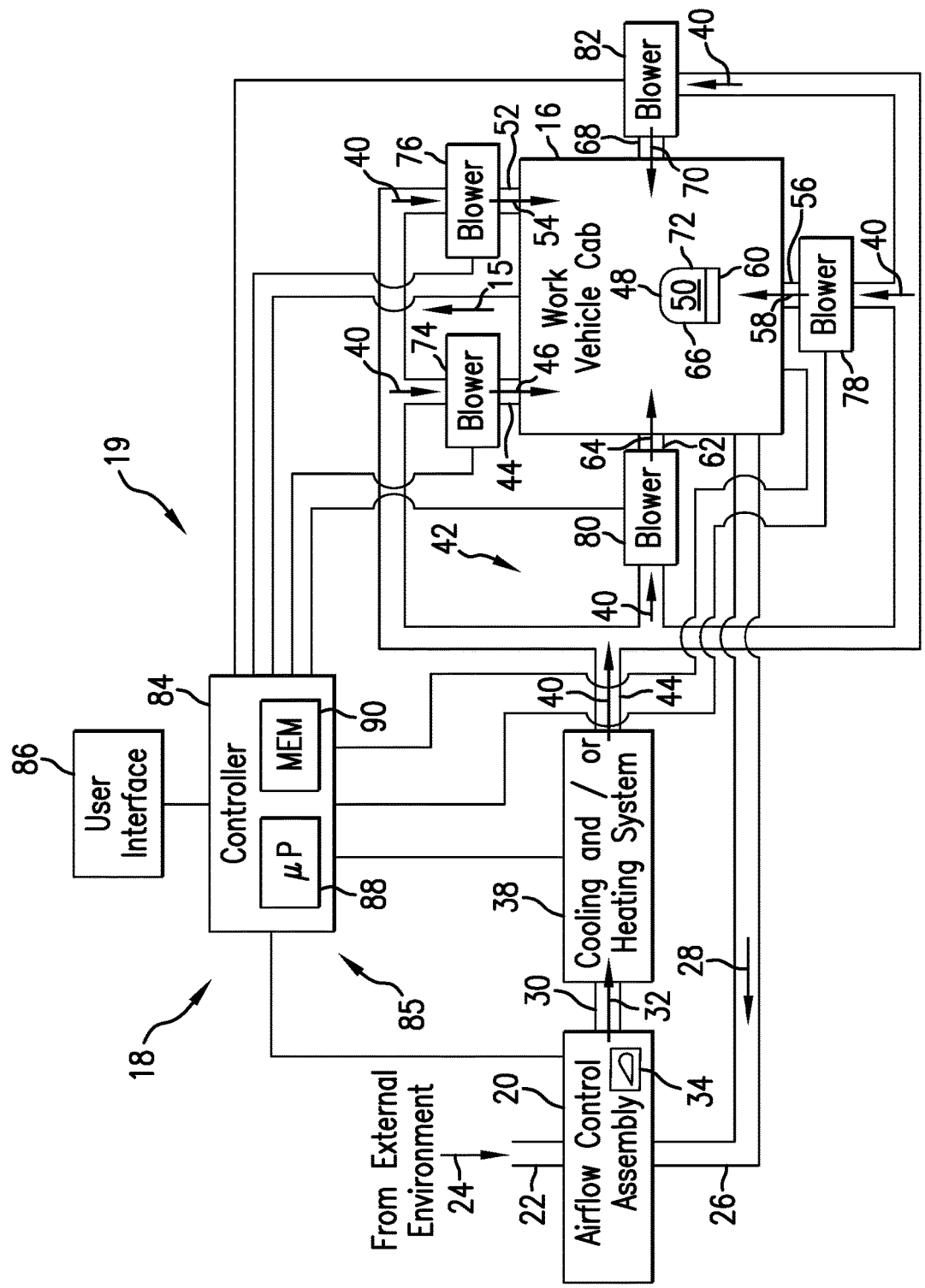
FIG. 2 illustrates a schematic diagram of an exemplary embodiment of a heating, ventilation, and air conditioning (HVAC) system coupled to a cab environment within the cab of FIG. 1, in accordance with an exemplary embodiment of the present disclosure.

Referring now to FIG. 2, a schematic diagram of an exemplary embodiment of a heating, ventilation, and air conditioning (HVAC) system 18 that may be coupled to the cab environment is illustrated. The HVAC system 18 is configured to regulate a temperature and a pressure in the cab environment, as will be described further herein. It should be appreciated that many different types of HVAC systems may be incorporated in the cab 16 according to the present disclosure, and the described HVAC system 18 is only one example of how such a system may be configured.

In the illustrated embodiment, the HVAC system 18 includes an airflow control system 19 configured to control airflow into the cab environment of the cab 16. The airflow control system 19 includes an airflow control assembly 20 configured to control mixing of air from an environment external to the cab 16 (e.g., the external environment) and air recirculated from the cab 16. The airflow control assembly 20 includes a body having a first inlet 22 configured to receive an input airflow 24 from the external environment, and a second inlet 26 configured to receive a recirculation airflow 28 from the interior of the cab 16. The body of the airflow control assembly 20 also includes an outlet 30 configured to output an output airflow 32 toward the interior of the cab 16. In certain embodiments, the airflow control assembly 20 includes a door 34 disposed within the body and configured to move (e.g., rotate) relative to the body to control the input airflow through the first inlet 22 and the recirculation airflow through the second inlet 26, thereby controlling mixing of the external air and the recirculated air. For example, while the door 34 is in a first position, the recirculation airflow 28 may be substantially blocked, such that the output airflow 32 includes mostly air from the external environment (e.g., more than 95 percent, more than 97 percent, more than 98 percent, more than 99 percent, more than 99.5 percent, etc.). In addition, while the door 34 is in a second position, the input airflow 24 may be substantially blocked, such that the output airflow 32 includes mostly recirculated air (e.g., more than 95 percent, more than 97 percent, more than 98 percent, more than 99 percent, more than 99.5 percent, etc.). And, while the door 34 is in a position between the first and second positions, the output airflow 32 may include a mixture of air from the external environment and recirculated air.

In the illustrated embodiment, the HVAC system 18 includes a cooling and/or heating system 38 configured to receive the airflow control assembly output airflow 32 and to output a cooled and/or heated airflow 40 having a higher or lower temperature than the airflow control assembly output airflow 32. As illustrated, the cooled and/or heated airflow 40 flows into an air distribution system 42 via an inlet 44 to the air distribution system. During certain operating conditions, the cooling and/or heating system 38 may be deactivated. As a result, the temperature of the airflow 40 may be substantially equal to the airflow control assembly output airflow 32. The cooling and/or heating system 38 may include a heater core of a heating system and/or an evaporator of a refrigeration system, among other heating and/or cooling devices/systems. In certain embodiments, the cooling and/or heating system may be omitted, and the airflow control assembly output airflow 32 may flow directly into the air distribution system 42.

In the illustrated embodiment, the airflow control system 19 includes a first front vent assembly 44 configured to direct a first front airflow 46 toward a front side 48 of an occupant region 50 within the cab 16. In addition, the airflow control system 19 includes a second front vent assembly 52 configured to direct a second front airflow 54 toward the front side 48 of the occupant region 50. The airflow control system 19 also includes a rear vent assembly 56 configured to direct a rear airflow 58 toward a rear side 60 of the occupant region 50. Furthermore, the airflow control system 19 includes a left vent assembly 62 configured to direct a left airflow 64 toward a left side 66 of the occupant region 50. The airflow control system 19 also includes a right vent assembly 68 configured to direct a right airflow 70 toward a right side 72 of the occupant region 50. Each of the vent assemblies may include one vent or multiple vents (e.g., spaced apart from one another within the interior of the cab 16). In addition, certain vent(s) of the vent assemblies 44, 52, 56, 62, 68 may include adjustable flap(s) to control an output direction of the respective airflow(s). In the illustrated embodiment, the occupant region 50 corresponds to an occupant seat within the interior of the cab 16. However, it should be appreciated that in alternative embodiments, the occupant region may correspond to any suitable location where the occupant may be positioned.

In the illustrated embodiment, the airflow control system 19 includes a first front blower 74 configured to receive the cooled and/or heated airflow 40 (e.g., input airflow) and to provide the first front airflow 46 to the first front vent assembly 44. In addition, the airflow control system 19 includes a second front blower 76 configured to receive the input airflow 40 and to provide the second front airflow 54 to the second front vent assembly 52. The airflow control system 19 also includes a rear blower 78 configured to receive the input airflow 40 and to provide the rear airflow 58 to the rear vent assembly 56. Furthermore, the airflow control system 19 includes a left blower 80 configured to receive the input airflow 40 and to provide the left airflow 64 to the left vent assembly 62. The airflow control system 19 also includes a right blower 82 configured to receive the input airflow 40 and to provide the right airflow 70 to the right vent assembly 68. In the illustrated embodiment, the air distribution system 42 is fluidly coupled to the first front blower 74, to the second front blower 76, to the rear blower 78, to the left blower 80, and to the right blower 82. The air distribution system 42 is configured to receive the input airflow 40 from the inlet 44 and to direct the input airflow to each of the blowers (e.g., via a network of conduits). Accordingly, each of the blowers 74, 76, 78, 80, 82 receives the input airflow from a common source (e.g., the inlet 44 of the air distribution system 42).

While the illustrated embodiment includes two front vent assemblies and two front blowers, it should be appreciated that in alternative embodiments, the airflow control system 19 may include more of fewer front vent assemblies/blowers. For example, in certain embodiments, the airflow control system 19 may include a single front vent assembly (e.g., having multiple vents) and a single front blower. In further embodiments, the airflow control system 19 may include 3, 4, 5, 6, or more front vent assemblies and a corresponding number of front blowers. Furthermore, while the illustrated embodiment includes a single rear vent assembly and a single rear blower, it should be appreciated that in alternative embodiments, the airflow control system 19 may include more rear vent assemblies/blowers (e.g., 2, 3, 4, 5, 6, or more). In addition, while the illustrated embodiment includes a single left vent assembly and a single left blower, it should be appreciated that in alternative embodiments, the airflow control system 19 may include more or fewer left vent assemblies/blowers (e.g., 0, 1, 2, 3, 4, 5, 6, or more). While the illustrated embodiment includes a single right vent assembly and a single right blower, it should be appreciated that in alternative embodiments, the airflow control system 19 may include more or fewer right vent assemblies/blowers (e.g., 0, 1, 2, 3, 4, 5, 6, or more).

In the illustrated embodiment, the airflow control system 19 includes a controller 84, which may be an element of an automatic temperature control system 85, communicatively coupled to the airflow control assembly 20, the cooling and/or heating system 38, the first front blower 74, the second front blower 76, the rear blower 78, the left blower 80, and the right blower 82. The controller 84 may be configured to instruct an actuator of the airflow control assembly 20 to control the position of the door 34, thereby controlling the mixing of the external air and the recirculated air. In addition, the controller 84 may be configured to control the capacity of each blower, thereby controlling the flow rate of each respective airflow into the interior of the cab 16. The controller 84 may also be configured to control the cooling and/or heating system 38 to control the temperature of the airflow into the interior of the cab 16. In the illustrated embodiment, the controller 84 is communicatively coupled to a user interface 86. The user interface 86 may be located within the cab 16 of the work vehicle 10 and configured to receive input from the operator, such as input for controlling the airflow control assembly, the blowers, the cooling and/or heating system, or a combination thereof.

In certain embodiments, the controller 84 is an electronic controller having electrical circuitry configured to process data from certain components of the HVAC system 18, such as the user interface 86. The controller 84 includes a processor, such as the illustrated microprocessor 88, and a memory device 90. The controller 84 may also include one or more storage devices and/or other suitable components. The processor 88 may be used to execute software, such as software for controlling the airflow control system, the blowers, and so forth. Moreover, the processor 88 may include multiple microprocessors, one or more "general-purpose" microprocessors, one or more special-purpose microprocessors, and/or one or more application specific integrated circuits (ASICS), or some combination thereof. For example, the processor 88 may include one or more reduced instruction set (RISC) processors.

The memory device 90 may include a volatile memory, such as random access memory (RAM), and/or a nonvolatile memory, such as read-only memory (ROM). The memory device 90 may store a variety of information and may be used for various purposes. For example, the memory device 90 may store processor-executable instructions (e.g., firmware or software) for the processor 88 to execute, such as instructions for controlling the airflow control system, the blowers, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the airflow control system, etc.), and any other suitable data.

In known work vehicles, the HVAC system often produces a positive pressure, i.e., pressurizes, the cab environment within the cab. Pressurizing the cab environment may reduce the ingress of dirt and/or other contaminants, such as crop material dust, enhance operator comfort, reduce noise, or a combination thereof. While pressurizing the cab environment to certain levels increases operator comfort, passenger comfort can be reduced if the cab environment is over-pressurized. The cab environment may become overpressurized when, for example, the door to the cab is slammed shut and a large amount of air is rapidly introduced into the cab environment.

Figure 4:
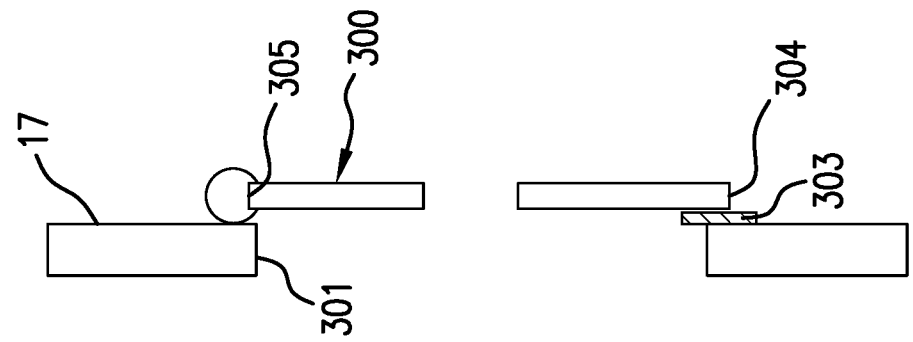
FIG. 4 is a cross-sectional view of the pressure control flap taken along line 4-4 in FIG. 3.
Figure 3:
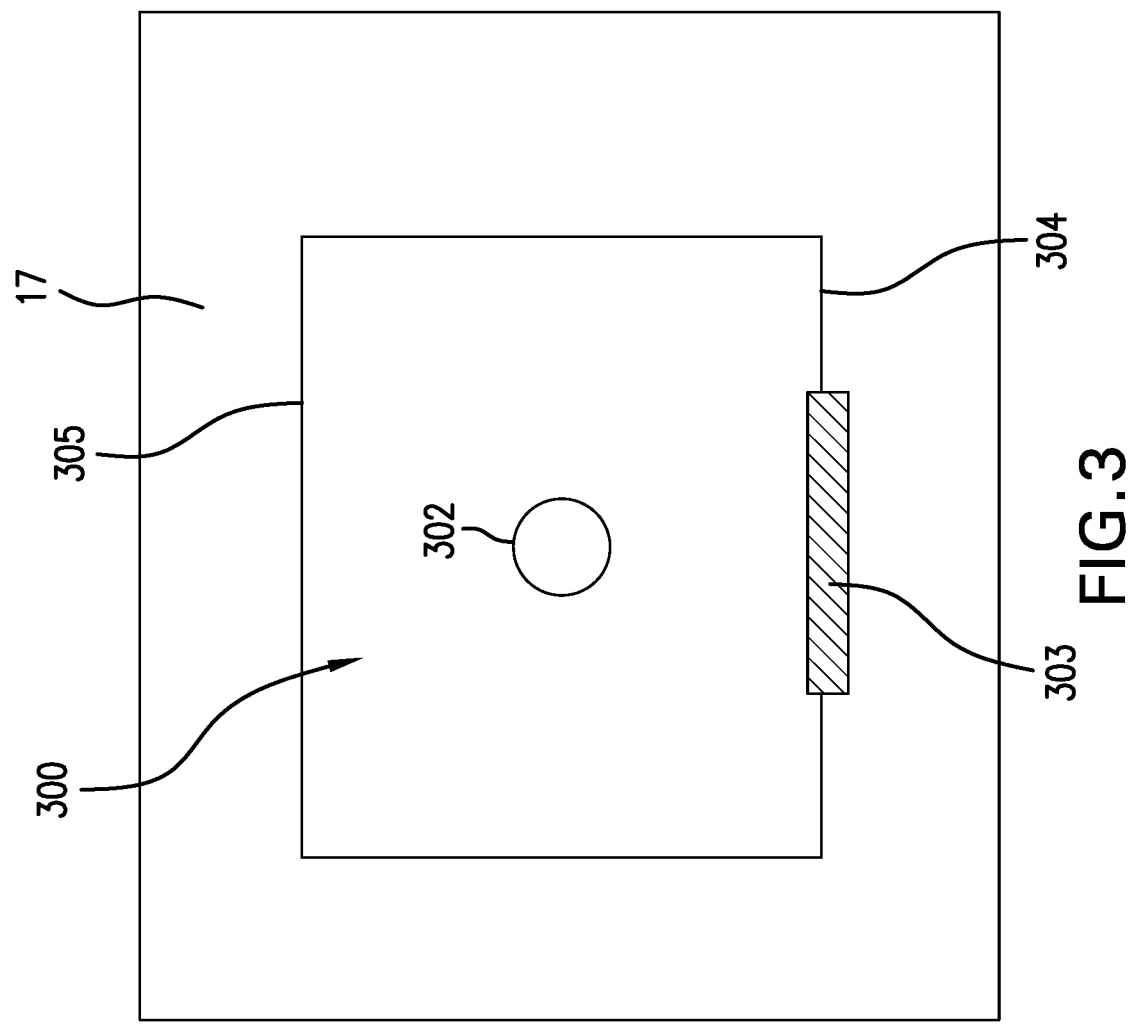
FIG. 3 illustrates a pressure control flap associated with a vent opening formed in a wall of the cab, in accordance with an exemplary embodiment of the present disclosure.

To address some of the previously described issues, and referring now to FIGS. 3-4, a pressure control flap 300 is associated with a vent opening 301 formed in one of the walls 17 enclosing the cab environment or the door 13. The flap 300 is "associated with" the vent opening 301 in the sense that the flap 300 can be closed, i.e., cover the vent opening 301, in certain positions and be open, i.e., uncover the vent opening 301, in other positions, as will be described further herein. The vent opening 301 may be formed in a wall 17 that does not include the door opening 11, such as a top wall of the cab 16. Alternatively, the vent opening 301 may be formed in the wall 17 that includes the door opening 11. In some embodiments, the vent opening 301 is formed in the door 13, which may act as a wall enclosing the cab environment when closed.

The flap 300 includes a pressure-relief opening 302 formed therein and a magnetic portion 303. As illustrated, the pressure-relief opening 302 may be a circular opening that is formed in a center of the flap 300. It should be appreciated that the pressure-relief opening 302 may be shaped other than circular and does not need to be placed in the center of the flap 300. The size of the pressure-relief opening 302, i.e., the area of the opening 302, may be adjusted to help control the pressure in the cab environment, as will be described further herein. In some embodiments, the flap 300 includes a plurality of pressure-relief openings that act together to allow pressure relief from the cab environment. The flap 300 may comprise a flexible material, such as a rubber, that can elastically deform or a rigid material that tends to maintain its shape during movement of the flap 300. As pressure develops in the cab environment, air leaks through the pressure-relief opening 302.

The magnetic portion 303 may extend along a first edge 304 of the flap 300. A second edge 305 of the flap 300, which is opposite the first edge 304, may be hingedly connected to the wall 17 or the door 13 with the vent opening 301. In some embodiments, the magnetic portion 303 is a magnetic strip that extends along a portion of the first edge 304. The magnetic strip 303 may comprise any type of magnetic material, such as one or more ferrous metals. At least a portion portion of the wall 17 or the door 13 with the vent opening 301 may comprise a ferrous metal so the magnetic strip 303 is magnetically attracted to the metal of the wall 17. Alternatively, or additionally, the wall 17 or the door 13 may include a separate magnetic strip that attracts the magnetic strip 303 of the flap 300.

The magnetic portion 303 is configured to hold the flap 300 closed when the pressure of the cab environment is below a threshold pressure and allow the pressure to open the flap 300 when the pressure exceeds the threshold pressure to allow further air leakage and reduce the pressure in the cab environment. The amount and strength of the magnetic material in the magnetic portion 303, as well as the size of the pressure-relief opening 302, can define the value of the threshold pressure that will open the flap 300. The threshold pressure that opens the flap 300 can be determined by, for example, analyzing a surface area of the flap 300 on which the pressure acts, a size of the pressure-relief opening 302 that allows pressure relief, and an attraction force between the magnetic portion 303 and, for example, the wall 17 or the door 13 attracting the magnetic portion 303. The pressure-relief opening 302 and the magnetic portion 303 can be configured so the threshold pressure is, for example, between 20 Pa and 200 Pa, such as between 50 Pa and 130 Pa, which have been found to be comfortable operating pressures. In some embodiments, the pressure-relief opening 302 and the magnetic portion 303 are configured so the threshold pressure is 100 Pa, which can limit the ability of the pressure in the cab environment to exceed 130 Pa.

Figure 5:
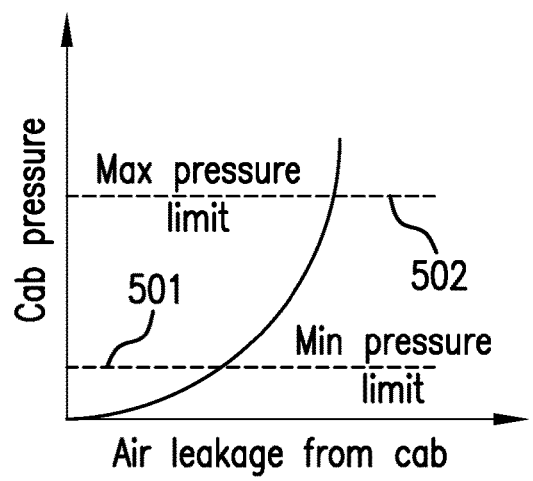
FIG. 5 is a graph illustrating cab pressure vs. air leakage for a cab that only has a pressure-relief opening.
Figure 6:
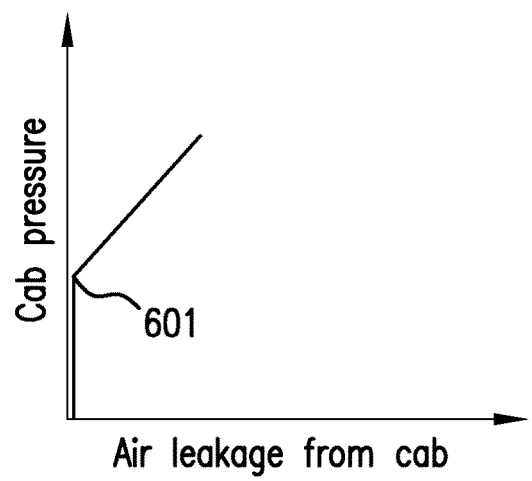
FIG. 6 is a graph illustrating cab pressure vs. air leakage for a cab that only has a flap with a magnetic portion.
Figure 7:
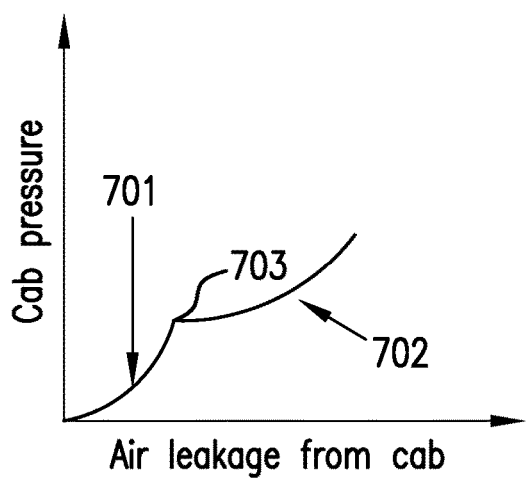
FIG. 7 is a graph illustrating cab pressure vs. air leakage for a cab that has a pressure control flap including a pressure-relief opening and a magnetic portion, in accordance with an exemplary embodiment of the present disclosure.

Referring now to FIGS. 5-7, pressure within the cab environment vs air leakage is illustrated for various configurations. Referring specifically to FIG. 5, cab pressure vs. air leakage is illustrated for a cab where pressure relief is provided by only a circular pressure-relief opening. As can be seen, the air leakage from the cab increases in a quadratic fashion as the cab pressure increases due to the increased cab pressure forcing an increasing amount air inside the cab environment out through the fixed-size opening. This configuration is effective to reduce pressure in the cab environment but there are instances where pressure in the cab environment is below a minimum pressure limit 501 where operator comfort is increased, such as when airflow into the cab environment is low, or above a maximum pressure limit 502 where operator comfort is decreased, such as when airflow is increased or the door to the cab slams shut. Thus, the configuration with only a pressure-relief opening does not tend to properly maintain the desired pressure in the cab at low airflow and high airflow settings or when the door slams shut.

Referring specifically to FIG. 6, cab pressure vs. air leakage is illustrated for a cab where pressure relief is provided by only a flap with a magnetic portion. As can be seen, the cab pressure increases with minimal, if any, air leakage from the cab until the air pressure reaches a threshold pressure point 601 where the flap opens. Once the air pressure reaches the threshold pressure point 601, the flap opens and the air leakage increases at a linear rate to relieve cab pressure. While this configuration can keep the cab sufficiently pressurized at low airflow settings and dampen the effects of door slamming, the pressure that develops in the cab environment may be too high at low airflow settings before the flap opens to relieve pressure.

Referring specifically now to FIG. 7, cab pressure vs. air leakage is illustrated for the cab 16 provided in accordance with the present disclosure and including the pressure control flap 300 with a pressure-relief opening 302 and a magnetic portion 303. As can be seen, there are two distinct regions of air leakage that occur: a first region 701 where the pressure in the cab environment is below the threshold pressure and a second region 702 where the pressure in the cab environment is above the threshold pressure. At cab pressures in the first region 701, air leakage is mostly due to air escaping the cab environment through the pressure-relief opening 302. The pressure-relief opening 302 can be chosen to be a relatively small size, such as between 10 and 50 mm, so pressure in the cab environment reaches a comfortable level even at low airflow settings.

Once the cab pressure is in the second region 702, the pressure in the cab environment reaches a threshold pressure value 703 and overcomes the magnetic force of the magnetic portion 303 to open the flap 300 and allow further air leakage out of the vent opening 301 in addition to air leakage through the pressure-relief opening 302. In this sense, the flap 300 can allow a relatively small amount of air leakage out of the cab environment via just the pressure-relief opening 302 until the pressure reaches the threshold pressure, at which point the flap 300 can open to significantly increase the amount of air leakage out of the cab environment. The increased rate of air leakage helps maintain the pressure at a comfortable level, as can be seen in FIG. 7, while the small amount of air leakage prior to the pressure reaching the threshold pressure allows the cab 16 to become pressurized and increase operator comfort. The ability of the flap 300 to effectively vent pressure above the threshold pressure also allows the flap 300 to dampen pressure increases caused by, for example, the door 13 slamming shut.

From the foregoing, it should be appreciated that the flap 300 provided in accordance with the present disclosure can help keep the pressure in the cab environment at comfortable levels in various different scenarios. When airflow is relatively low, air leakage occurs primarily through the pressure-relief opening 302, which may be relatively small, so pressure is allowed to build to increase operator comfort without becoming excessive. In high pressure scenarios, such as during high airflow and/or the door 13 slamming, the flap 300 can open to significantly increase the air leakage from the cab environment and decrease the rate of pressure increase in the cab environment. Therefore, the flap 300 represents an inexpensive and convenient way to help keep the pressure in the cab environment within the comfortable pressure range in a variety of different operating scenarios.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A cab for a work vehicle, comprising:
   a plurality of walls enclosing a cab environment;
   a door coupled to one of the walls, one of the walls or the door comprising a vent opening;
   a heating, ventilation, and air conditioning (HVAC) system coupled to the cab environment and configured to regulate a temperature and a pressure of the cab environment; and
   a pressure control flap associated with the vent opening and comprising a pressure-relief opening and a magnetic portion that is configured to hold the flap closed when the pressure of the cab environment is below a threshold pressure and allow the pressure to open the flap when the pressure exceeds the threshold pressure.

2. The cab of claim 1, wherein the pressure-relief opening is formed in a center of the flap.

3. The cab of claim 2, wherein the pressure-relief opening is a circular opening.

4. The cab of claim 1, wherein the magnetic portion comprises a magnetic strip extending along a first edge of the flap.

5. The cab of claim 4, wherein at least a portion of the wall or the door comprising the vent opening comprises a ferrous metal and the magnetic strip is magnetically attracted to the ferrous metal.

6. The cab of claim 4, wherein the flap is hingedly connected to the wall or the door comprising the vent opening at a second edge that is opposite the first edge.

7. The cab of claim 1, wherein the flap is a flexible flap.

8. The cab of claim 7, wherein the flap is hingedly connected to the wall or the door comprising the vent opening.

9. The cab of claim 1, wherein the threshold pressure is between 50 Pa and 130 Pa.

10. A work vehicle, comprising:
    a chassis;
    a cab carried by the chassis, the cab comprising:
       a plurality of walls enclosing a cab environment;
       a door coupled to one of the walls, one of the walls or the door comprising a vent opening;
       a heating, ventilation, and air conditioning (HVAC) system coupled to the cab environment and configured to regulate a temperature and a pressure of the cab environment; and a pressure control flap associated with the vent opening and comprising a pressure-relief opening and a magnetic portion that is configured to hold the flap closed when the pressure of the cab environment is below a threshold pressure and allow the pressure to open the flap when the pressure exceeds the threshold pressure.

11. The work vehicle of claim 10, wherein the pressure-relief opening is formed in a center of the flap.

12. The work vehicle of claim 11, wherein the pressure-relief opening is a circular opening.

13. The work vehicle of claim 10, wherein the magnetic portion comprises a magnetic strip extending along a first edge of the flap.

14. The work vehicle of claim 13, wherein at least a portion of the wall or the door comprising the vent opening comprises a ferrous metal and the magnetic strip is magnetically attracted to the ferrous metal.

15. The work vehicle of claim 13, wherein the flap is hingedly connected to the wall or the door comprising the vent opening at a second edge that is opposite the first edge.

16. The work vehicle of claim 10, wherein the flap is a flexible flap.

17. The work vehicle of claim 16, wherein the flap is hingedly connected to the wall or the door comprising the vent opening.

18. The work vehicle of claim 10, wherein the threshold pressure is between 50 Pa and 130 Pa.

* * * * *